(12) United States Patent
Yamada et al.

(10) Patent No.: US 7,246,842 B2
(45) Date of Patent: Jul. 24, 2007

(54) VISOR FOR AN AUTOMOBILE (75) Inventors: Shingo Yamada, Komaki (JP);
Tomokazu Hirota, Komaki (JP);
Shinya Kumazaki, Komaki (JP)

(73) Assignees: Tamura Plastic Mfg. Co., Ltd.,
Komaki-Shi (JP); Toyota Motor Corporation, Toyota-Shi (JP)

( * ) Notice: Subject to any disclaimer, the term of this patent is extended or adjusted under 35 U.S.C. 154(b) by 0 days.

(21) Appl. No.: 11/516,416

(22) Filed: Sep. 6, 2006

(65) Prior Publication Data

US 2007/0001480 A1 Jan. 4, 2007

Related U.S. Application Data (63) Continuation of application No. PCT/JP2005/004979, filed on Mar. 18, 2005.

(30) Foreign Application Priority Data

Mar. 19, 2004 (JP) .............................. 2004-081180

(51) Int. Cl.
*B60J 3/00* (2006.01)
(52) U.S. Cl. .................................... 296/152
(58) Field of Classification Search ...................... None
See application file for complete search history.

(56) References Cited

U.S. PATENT DOCUMENTS

| | | | | | |
|---|---|---|---|---|---|
| 3,785,699 | A | * | 1/1974 | Molaskey et al. | .......... 296/152 |
| 4,347,781 | A | * | 9/1982 | Hassell | ........................ 454/135 |
| 4,426,111 | A | * | 1/1984 | Smith | ......................... 296/152 |
| 4,527,466 | A | * | 7/1985 | Kossor et al. | .............. 454/133 |
| 5,150,941 | A | * | 9/1992 | Silzer et al. | ................ 296/152 |
| 5,251,953 | A | * | 10/1993 | Willey | ........................ 296/152 |
| 5,284,377 | A | * | 2/1994 | Krenciprock | ............... 296/154 |
| 6,042,473 | A | * | 3/2000 | McClary | ..................... 454/133 |
| 6,557,927 | B2 | * | 5/2003 | Kanie | ......................... 296/152 |
| 6,877,792 | B2 | * | 4/2005 | Kanie et al. | ................ 296/152 |
| 2003/0025355 | A1 | * | 2/2003 | Kanie | ......................... 296/152 |
| 2003/0214149 | A1 | * | 11/2003 | Kanie et al. | ................ 296/152 |
| 2006/0049663 | A1 | * | 3/2006 | Kodama et al. | ............ 296/152 |

FOREIGN PATENT DOCUMENTS

| | | |
|---|---|---|
| JP | 40-030085 Y1 | 10/1965 |
| JP | 58-110521 U1 | 7/1983 |
| JP | 61-132115 U1 | 8/1986 |

(Continued)

*Primary Examiner*—H Gutman
(74) *Attorney, Agent, or Firm*—Burr & Brown (57) ABSTRACT

A visor for an automobile is provide, which does not impair the design of the automobile when mounted on a window frame of the automobile. A side visor includes a brim portion made of stainless steel formed along a window frame of an automobile, and a visor portion made of acrylic resin formed so as to expand from the brim portion when mounted on the brim portion. The brim portion is provided at its lower edge with a connecting portion. The visor portion has an inner side of an upper edge that is provided with a bonding portion having a width approximately equal to the width of the connecting portion and expanding inwardly. By bonding the connecting portion of the brim portion and the bonding portion of the visor portion together by an adhesive tape, the brim portion and the visor portion are connected together.

17 Claims, 8 Drawing Sheets

FOREIGN PATENT DOCUMENTS

| | | |
|---|---|---|
| JP | 62-076719 U1 | 5/1987 |
| JP | 02-014817 U1 | 1/1990 |
| JP | 04-266523 A1 | 9/1992 |
| JP | 04-123745 U1 | 11/1992 |
| JP | 06-018026 U1 | 3/1994 |
| JP | 08-244452 A1 | 9/1996 |
| JP | 09-136537 A1 | 5/1997 |
| JP | 2000-067337 A1 | 3/2000 |
| JP | 2002-219933 A1 | 8/2002 |
| JP | 2002-317803 A1 | 10/2002 |
| JP | 2003-182356 A1 | 7/2003 |

* cited by examiner

VISOR FOR AN AUTOMOBILE

This application claims the benefit of PCT application No. PCT/JP2005/4979 filed on Mar. 18, 2005, the entirety of which is incorporated by reference.

BACKGROUND OF THE INVENTION

1. Field of the Invention

The present invention relates to a visor for an automobile mounted on a window frame of an automobile.

2. Description of the Related Art

As a visor for an automobile mounted on a window frame of an automobile for protection against rain and sunbeam or ornamental purpose, one has been conventionally known in which a brim portion mounted on the window frame and a visor portion connected from the brim portion are integrally formed.

Figure 13:
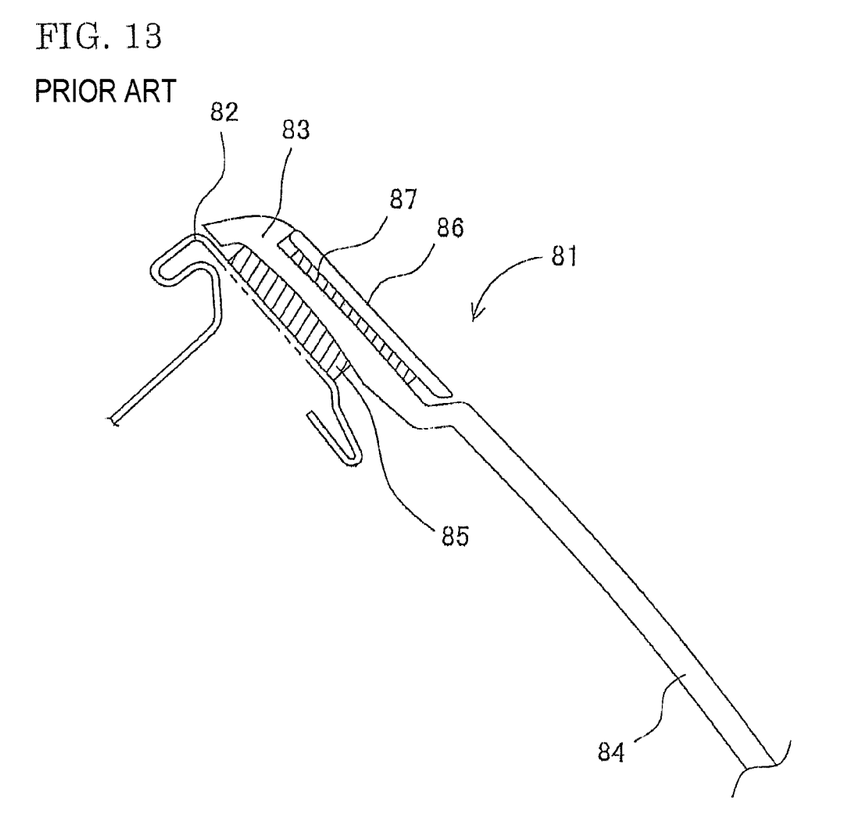
FIG. 13 is an illustrative drawing of a section of a conventional visor for an automobile.

FIG. 13 is an illustrative drawing of a state in which a side visor which is an example of the above-mentioned conventional visor for an automobile is mounted on a window frame of an automobile. A side visor 81 includes a brim portion 83 made of synthetic resin (for example, acrylic resin) mounted on a window frame 82 of an automobile, and a visor portion 84 made of synthetic resin formed so as to expand from the brim portion 83. The brim portion 83 and the visor portion 84 are integrally formed by injection molding. Also, the brim portion 83 has an adhesive tape (for example, two-sided tape) 85 adhered to its inner surface side. With that adhesive tape 85, the side visor 81 is mounted on the window frame 82. On the other hand, in order to eliminate a sense of discomfort in appearance and achieve a sense of unity with the window frame when mounted on the automobile, the brim portion 83 has a moulding 86 made of metal (stainless steel) with a constant width adhered to its outer surface side via an adhesive tape (for example, two-sided tape) 87.

Also, in the side visor 81 with the moulding 86 as described above being adhered to the outer surface side, the moulding may fall off while the automobile is running. To prevent this, as in the Japanese Patent-Laid Open Publication No. 9-136537, a side visor has been devised in which the outer surface side of the brim portion is plated with metal. Furthermore, as in Japanese Patent-Laid Open Publication No. 2002-219933, another side visor has also been devised in which an ornamental tape is adhered to the upper surface of the visor body and a side edge of that ornamental tape is folded to the backside of the visor body.

However, in the side visor with the moulding 86 adhered to the brim portion 83, when mounted on the window frame 82 of the automobile, the brim portion 83 made of synthetic resin overlaps with a vehicle's moulding made of metal surrounding the window frame 82. Furthermore, at the adhering portion of the moulding 86, with the thickness of each of the adhesive tapes 85 and 87, the thickness of the moulding 86, and the thickness of the brim portion 83 (normally, 8 mm in total), the outer surface of the brim portion 83 may be far away from the surface of the window frame 82, thereby disadvantageously forming a large step between the outer surface of the brim portion 83 and the surface of the window frame 82. For this reason, the side visor with the moulding 86 adhered to the brim portion 83 cannot achieve a sense of unity with the window frame when mounted on the automobile, thereby causing an inconvenience of impairing design near the window frame of the automobile. In addition, the moulding 86 has a width that is constant in a vertical direction. Thus, if the width of the vehicle moulding in a vertical direction is varied from the front to rear of the automobile, a sense of unity with the window frame will be further impaired.

Moreover, in the visor for an automobile with the brim portion plated with metal as in the Japanese Patent-Laid Open Publication No. 9-136537 or the visor for an automobile with an ornamental tape adhered as in the Japanese Patent-Laid Open. Publication No. 2002-219933, since the metal-plated portion and the ornamental tape cannot achieve texture similar to that of the vehicle moulding surrounding the window frame, a sufficient sense of unity with the window frame cannot be obtained.

An object of the present invention is to solve the problems involved in the conventional visors for automobiles and provide a visor for an automobile not impairing design surrounding the window frame of an automobile when mounted on the window frame of the automobile.

SUMMARY OF THE INVENTION

In the present invention, in the structure of the present invention according to a first aspect, a visor for an automobile including a brim portion mountable on a window frame of an automobile and a visor portion formed in a long strip shape along the brim portion is provided, wherein the brim portion and the visor portion are formed individually, and the brim portion is made of metal.

In the structure of the present invention according to a second aspect based on the first aspect, the brim portion is provided with a covering portion to be fixed to the window frame of the automobile and a connecting portion to be connected to an upper edge of the visor portion, and the covering portion is formed so as to have a width in a vertical direction approximately equal to a width of the window frame or an ornamental moulding in a vertical direction. Here, the width of the covering portion in the vertical direction is preferably within a range of 70 to 125%, more preferably, 90% to 110%, of the ornamental moulding (so-called vehicle moulding) provided to surround the window frame of the automobile. When the width of the covering portion in a vertical direction is adjusted to the above-mentioned range, if the visor portion is formed of synthetic resin, the vehicle moulding and the portion of the visor for an automobile formed of synthetic resin hardly overlap each other. Therefore, an extremely high sense of unity can be achieved. In addition, the width of the connecting portion in the vertical direction is preferably within a range of 8.0 to 20.0 mm. If the width of the connecting portion in the vertical direction is below 8.0 mm, the connection strength with the visor portion is decreased, and such a decrease is not preferable. Conversely, if the width of the connecting portion in the vertical direction is above 20.0 mm, the appearance viewed from the outside of the visor portion is deteriorated, and such a deterioration is not preferable.

In the structure of the present invention according to a third aspect based on the second aspect, the connecting portion is provided to be formed so as to protrude downward from a lower end of the covering portion and to be concave with respect to an outer surface of the covering portion. When the visor portion is connected to the connecting portion, an outer surface of the visor portion and the outer surface of the covering portion are approximately on a same plane.

In the structure of the present invention according to a fourth aspect based on the second aspect, a section of the visor portion connected to the connecting portion is formed in a convex shape.

In the structure of the present invention according to a fifth aspect based on the second aspect, the connecting portion is formed with a protrusion protruding outwardly along a lower end.

In the structure of the present invention according to a sixth aspect based on the second aspect, the connecting portion and the upper edge of the visor portion are secured by a rivet penetrating through both of the connecting portion and the upper edge.

In the structure of the present invention according to a seventh aspect based on the second aspect, the upper edge of the visor portion is provided with a fitting protrusion, and the connecting portion is provided with a fitting hole, and the connecting portion and the upper edge of the visor portion are welded together in a state where the fitting protrusion fits in the fitting hole.

In the structure of the present invention according to an eighth aspect based on the second aspect, the connecting portion is provided with a fitting protrusion and the upper edge of the visor portion is provided with a fitting concave portion, and the connecting portion and the upper edge of the visor portion are bonded together in a state where the fitting protrusion fits in the fitting concave portion.

In the structure of the present invention according to a ninth aspect based on the second aspect, the upper edge of the visor portion is provided with a fitting protrusion and the connecting portion is provided with an insert hole, and the connecting portion and the upper edge of the visor portion are bonded together in a state where a tip of the fitting protrusion inserted in the insert hole is engaged with an engaging plate.

In the structure of the present invention according to a tenth aspect based on the second aspect, the connecting portion and the upper edge of the visor portion are welded together by insert molding.

In the structure of the present invention according to an eleventh aspect based on the second aspect, the brim portion is formed of a metal thin plate not thinner than 0.2 mm and not thicker than 4.0 mm.

In the structure of the present invention according to a twelfth aspect based on the first aspect, the brim portion is provided at an upper end with an engaging portion engageable with the window frame of the automobile. Here, the engaging portion is preferably provided so as to be folded inwardly along the upper edge of the brim portion. If the engaging portion is provided in such a manner, the engaging portion preferably has a width within a range of 1.0 to 8.0 mm, more preferably, 1.2 to 6.0 mm. If the width of the engaging portion is below 1.0 mm or above 6.0 mm, the sense of unity with the ornamental moulding (vehicle moulding) mounted on the window frame is impaired, and such an impairment is not preferable.

In the structure of the present invention according to a thirteenth aspect based on the twelfth aspect, the brim portion has a length extending from a front end to a rear end of the window frame of the automobile, and is provided with the engaging portion over an entire upper edge of the brim portion.

In the structure of the present invention according to a fourteenth aspect based on the twelfth aspect, the engaging portion is provided at an outer edge with a clinch engageable with the window frame of the automobile.

In the structure of the present invention according to a fifteenth aspect based on the first aspect, the brim portion has a side end on which an end cap is mounted.

In the structure of the present invention according to a sixteenth aspect based on the first aspect, the brim portion is formed by bending a side end (that is, a rear end for a visor for an automobile front door, and a front end for a visor for an automobile rear door) near a center side of the automobile when mounted on the automobile.

In the structure of the present invention according to a seventeenth aspect based on the first aspect, the brim portion is formed by coating, with synthetic resin, a side end near a center side of the automobile when mounted on the automobile.

In the structure of the present invention according to an eighteenth aspect based on the first aspect, the visor portion has a flat outer surface on a side end near a center side of the automobile when mounted on the automobile. Here, such a flat outer surface on the side end is preferably parallel to the outer surface of the window frame of the automobile and, more preferably, is adjusted so that a space between the outer surface of the side end and the outer surface of the window frame of the automobile is within a range of 2.5 mm to 6.0 mm. If the space between the outer surface of the side end and the outer surface of the window frame of the automobile is below 2.5 mm, the visor for an automobile cannot sufficiently function as a protection against wind and rain, and such a malfunction is not preferable. Conversely, if the space is above 6.0 mm, a sense of unity with the window frame of the automobile is impaired, and such an impairment is not preferable.

In the visor for an automobile according to the first aspect, the brim portion is made of metal. Because of this, when viewed from any angle, the visor for an automobile mounted on the automobile can achieve a strong sense of unity with the window frame of the automobile without impairing design surrounding the window frame of the automobile. Even when mounted on the automobile for a long time, the metal-made brim portion is not peeled off like a moulding or a metal-plated portion, thereby preventing the design from being impaired. In addition, since the brim portion and the visor portion are formed individually, it is possible to replace only the visor portion, for example.

In the visor for an automobile according to the second aspect, the covering portion of the brim portion is formed so as to have a width in a vertical direction approximately equal to a width of the window frame or an ornamental moulding in a vertical direction. Therefore, the visor for an automobile can achieve a strong sense of unity with the window frame of the automobile when mounted on the automobile, thereby eliminating a sense of discomfort in design.

In the visor for an automobile according to the third aspect, the connecting portion of the brim portion is formed so as to be concave. When the visor portion is connected to the brim portion, the outer surface of the covering portion and the outer surface of the visor portion are approximately on the same plane. Therefore, the visor for an automobile not only has an excellent design when mounted on the automobile, but also can let droplets of water attached onto the covering portion smoothly flow downward when it rains.

In the visor for an automobile according to the fourth aspect, the section connected to the connecting portion is formed in a convex shape. Therefore, at the time of manufacturing, it is possible to easily position the brim portion and the visor portion when assembled.

In the visor for an automobile according to the fifth aspect, the protrusion protruding outwardly along the lower end of the connecting portion is formed. Therefore, the bending strength of the brim portion is high, and the visor for an automobile resists damage even when receiving an impact.

In the visor for an automobile according to the sixth aspect, the connecting portion and the upper edge of the visor portion are secured by the rivet. Therefore, the connection strength between the connecting portion of the brim portion and the visor portion is extremely high. Even if an automobile on which the visor for an automobile is mounted receives a strong impact while traveling, the brim portion and the visor portion are not separated from each other.

In the visor for an automobile according to the seventh aspect, at the time of manufacturing, only by fitting the fitting protrusion of the visor portion in the fitting hole of the connecting portion, the brim portion and the visor portion can be assembled very easily.

In the visor for an automobile according to the eighth aspect, at the time of manufacturing, only by fitting the fitting protrusion of the visor portion in the fitting concave portion of the connecting portion, the brim portion and the visor portion can be assembled very easily. Moreover, when the brim portion and the visor portion are assembled, the fitting protrusion is not exposed outwardly, thereby achieving an excellent appearance.

In the visor for an automobile according to the ninth aspect, at the time of manufacturing, only by inserting the fitting protrusion of the visor portion into the insert hole of the connecting portion and engaging the tip of the fitting protrusion with the engaging plate, the brim portion and the visor portion can be assembled very easily. In addition, even without using a two-sided tape or the like, an extremely high connection strength can be achieved.

In the visor for an automobile according to the tenth aspect, at the time of manufacturing, the connecting portion and the upper edge of the visor portion are welded together by insert molding. Therefore, even without using a two-sided tape or the like, an extremely high connection strength can be achieved. Moreover, even if the visor portion is formed of transparent synthetic resin, only the inner surface of the connecting portion can be seen through from the outside of the upper edge of the visor portion. Therefore, the appearance would be excellent.

In the visor for an automobile according to the eleventh aspect, the brim portion is formed of a metal thin plate not thinner than 0.2 mm and not thicker than 4.0 mm. Such a brim portion is extremely thin compared with the conventional visor for an automobile. Therefore, the visor for an automobile can achieve a strong sense of unity with the window frame when mounted on the automobile. Here, in view of strength and processability, the thickness of the brim portion is more preferably within a range of 0.3 mm to 2.0 mm.

In the visor for an automobile according to the twelfth aspect, the brim portion is provided at an upper end with an engaging portion engageable with the window frame of the automobile, and thus the visor for an automobile can be very easily mounted on the automobile without using a separate piece of hardware. Further, at the time of mounting the visor on the automobile or providing maintenance, there is no such situation in which a piece of hardware is lost.

In the visor for an automobile according to the thirteenth aspect, the brim portion is provided with the engaging portion over the entire upper edge of the brim portion from the front end to the rear end of the window frame of the automobile. Therefore, when mounted on the automobile, the visor for an automobile can achieve a very strong sense of unity with the window frame of the automobile when viewed from any angle including front, side, and upper.

In the visor for an automobile according to the fourteenth aspect, a clinch engageable with the window frame of the automobile is provided at the outer edge of the engaging portion. By engaging the clinch with the window frame, the visor for an automobile can be mounted very easily on the automobile without using a separate piece of hardware. Moreover, the strength of mounting on the automobile is high, and even if an automobile on which the visor for an automobile is mounted receives a strong impact while traveling, the visor for an automobile would not fall off. In addition, the brim portion has a high strength and thus can resist damage.

In the visor for an automobile according to the fifteenth aspect, the brim portion has a side end on which an end cap is mounted. Therefore, injuries due to a contact with the side end of the brim portion after the visor for an automobile is mounted can be prevented.

In the visor for an automobile according to the sixteenth aspect, the side end near the center side of the automobile when the visor is mounted on the automobile is formed by bending. Therefore, even at a connecting portion between the front door and the rear door of the automobile, an extremely strong sense of unity with the window frame can be achieved.

In the visor for an automobile according to the seventeenth aspect, the side end of the brim portion near the center side of the automobile when the visor is mounted on the automobile is coated with synthetic resin. Therefore, there is no concern to damage the automobile at the time of mounting the visor on and removing the same from the automobile.

In the visor for an automobile according to the eighteenth aspect, the visor portion has a flat outer surface on a side end near a center side of the automobile when the visor is mounted on the automobile. Therefore, even at a connecting portion between the front door and the rear door of the automobile, an extremely strong sense of unity with the window frame can be achieved.

DETAILED DESCRIPTION OF THE INVENTION

Figure 1:
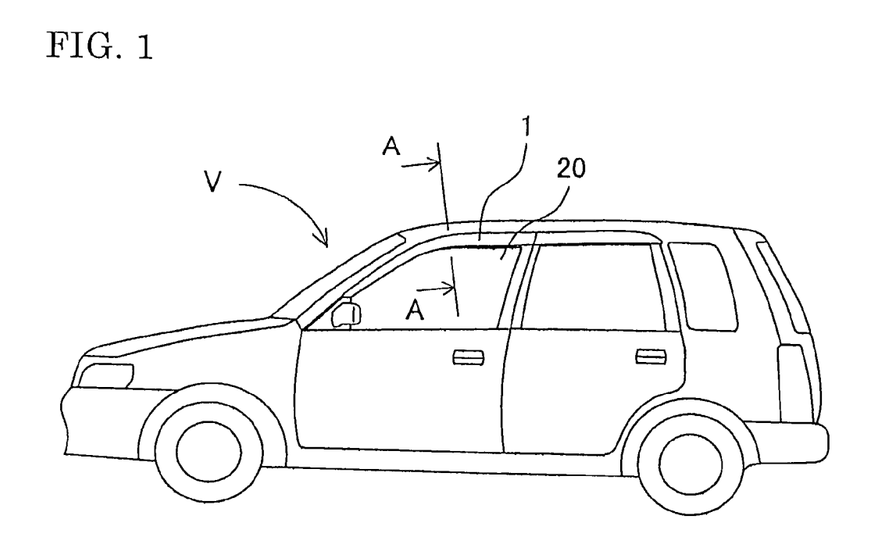
FIG. 1 is an illustrative drawing of a state where a side visor is mounted on an automobile.
Figure 2:
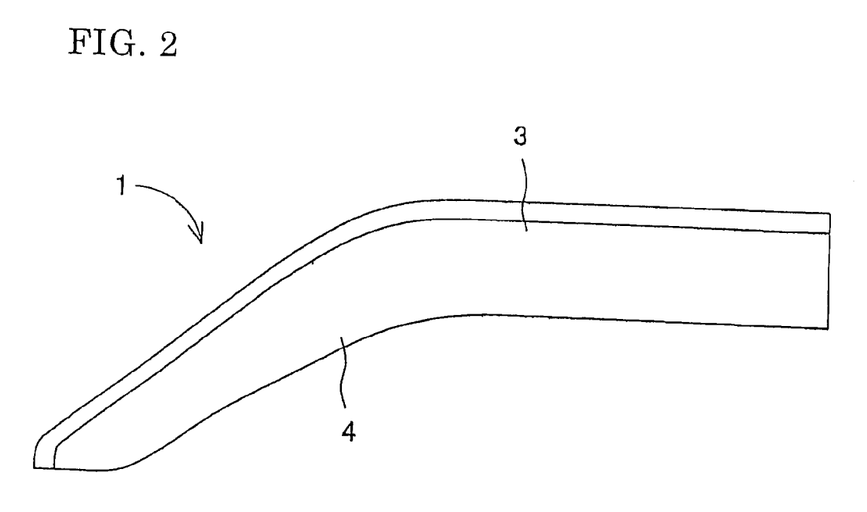
FIG. 2 is an illustrative drawing of the side visor viewed from the outside.
Figure 3:
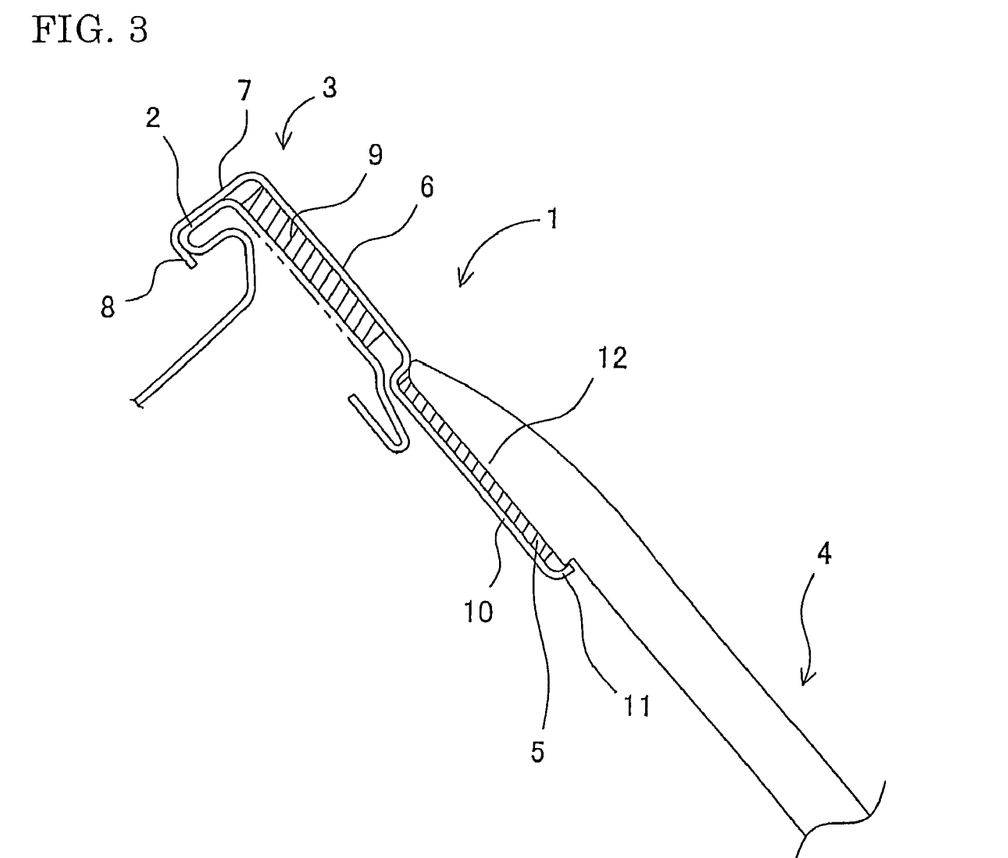
FIG. 3 is an illustrative drawing of a cross section along an A-A line in FIG. 1.

A side visor according to an embodiment of the visor for an automobile of the present invention is described in detail below based on the drawings. FIG. 1 is an illustrative drawing showing a side visor 1 mounted on an automobile V, and FIG. 2 is an illustrative drawing of the side visor 1 viewed from the outside. Furthermore, FIG. 3 is an illustrative drawing of a section (a section taken along line A-A in FIG. 1) of the side visor 1 (with the structure of the automobile side partially omitted). Here, in the following description, the automobile side in FIGS. 1 and 2 is taken as the outside of the side visor 1, while an opposite side is taken as the inside thereof for description purposes.

As shown in FIGS. 1 and 2, the side visor 1 includes a brim portion 3 made of metal (for example, made of stainless steel) formed in a long-blade shape along a rim 2 of a window portion of the automobile V (hereinafter referred to as a window frame), and a visor portion 4 made of synthetic resin (for example, made of acrylic resin) formed in a long-blade shape similarly to the brim portion 3.

The brim portion 3 is formed by bending a thin plate made of stainless steel (for example, with a thickness of approximately 0.4 mm) through so-called press moulding. As shown in FIG. 3, a cross section of the brim portion has an approximately S shape (inverted S shape). An upper portion of the brim portion 3 forms a strip-shaped covering portion 6 for covering the window frame 2 of the automobile V. The covering portion 6 has an inner surface on which an adhesive tape 9 (for example, the one having a width of approximately 1.2 mm) for mounting itself on the automobile V is adhered. Further, the covering portion 6 has an upper end at which an engaging portion 7 bent inwardly is formed. The engaging portion 7 has an upper edge at which an engaging convex portion 8 is provided, which is a clinch for engaging with the inside of the window frame 2. Here, the width of the covering portion 6 of the brim portion 3 in a vertical direction is approximately equal to the width of a vehicle moulding mounted on the window frame 2 of the automobile V in a vertical direction, which will be described further below.

Moreover, the brim portion 3 has a lower portion at which a connecting portion 10 for connection with the visor portion 4 is provided along a lower edge of the covering portion 6 as a single strip. The connecting portion 10 is in a state of being recessed to be concave so as to be positioned inwardly with respect to the covering portion 6. Furthermore, the connecting portion 10 has a lower edge at which a convex latch 11 engageable with the visor portion 4 is formed. That connecting portion 10 has an adhesive tape (two-sided adhesive tape) 5 adhered thereto for bonding the visor portion 4. With that adhesive tape 5, the upper-edge portion of the visor portion 4 is bonded. Here, a flat portion of the connecting portion 10 of the brim portion 3 is positioned inwardly with respect to the covering portion 6 by a sum of the thickness of the adhesive tape 5 and the thickness of the visor portion 4, and the upper edge of the visor portion 4 and the bonded covering portion 6 are on approximately the same plane.

The visor portion 4 is formed by injection molding of acrylic resin, bowed slightly in a vertical direction with its center portion expanding outwardly. Moreover, the visor portion 4 is formed of colored synthetic resin, thereby achieving moderate translucency and light-blocking effect. Furthermore, the visor portion 4 has an upper-inner surface on which a bonding portion 12 for bonding with the connecting portion 10 of the brim portion 3 is integrally provided and expands inwardly with respect to other portions. Here, the width of the bonding portion 12 in a vertical direction is approximately equal to the width of the connecting portion 10 in a vertical direction. On the other hand, the visor portion 4 has an upper-outer surface formed in a curved shape so as to be gradually thinner toward an upper end side. Moreover, the visor portion 4 has a flat outer surface on a rear edge.

The visor portion 4 as described above is integral with the brim portion 3 by bonding the surface of the bonding portion 12 to the connecting portion 10 of the brim portion 3 by the adhesive tape 5. Moreover, the visor portion 4 expands outwardly with respect to the brim portion 3 so as to cover an upper rim of a window pane 20 of the automobile V on which the visor portion is mounted. Here, the outer surface of the lower edge of the visor portion 4 is approximately flat. Moreover, the bonding portion 12 bonded to the connecting portion 10 of the brim portion 3 has a lower end latched by the convex latch 11 at the lower end of the connecting portion 10.

Figure 4:
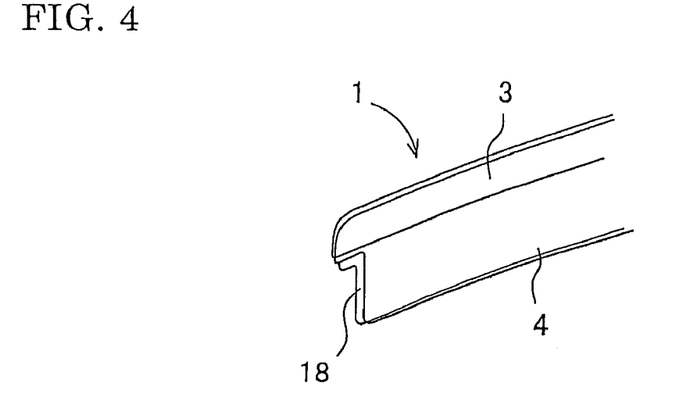
FIG. 4 is an illustrative drawing of a tip portion of the side visor.

FIG. 4 is an illustrative drawing of a tip portion of the side visor 1. The tip of the visor portion 4 is positioned behind the tip of the brim portion 3. Under the tip of the visor portion 4 and the tip of the brim portion 3, an engaging strip 18 in an inverted L shape for engaging with a door mirror base, which will be described further below, is protruded so as to be thinner than the adjacent visor portion 4 and brim portion 3.

An operation of mounting the side visor 1 on the window frame 2 of the automobile V is described below. Here, the window frame 2 of the automobile V is decorated with a moulding (vehicle moulding) made of metal (stainless steel). Moreover, at a front edge of the window frame 2 of the automobile V, a door mirror base 19 is provided under the vehicle moulding for fixing a door mirror. Above a rear edge of the door mirror base 19, an engaging concave portion 20 is provided in a slit shape having a predetermined width for engaging with the tip of the side visor 1.

Figure 5:
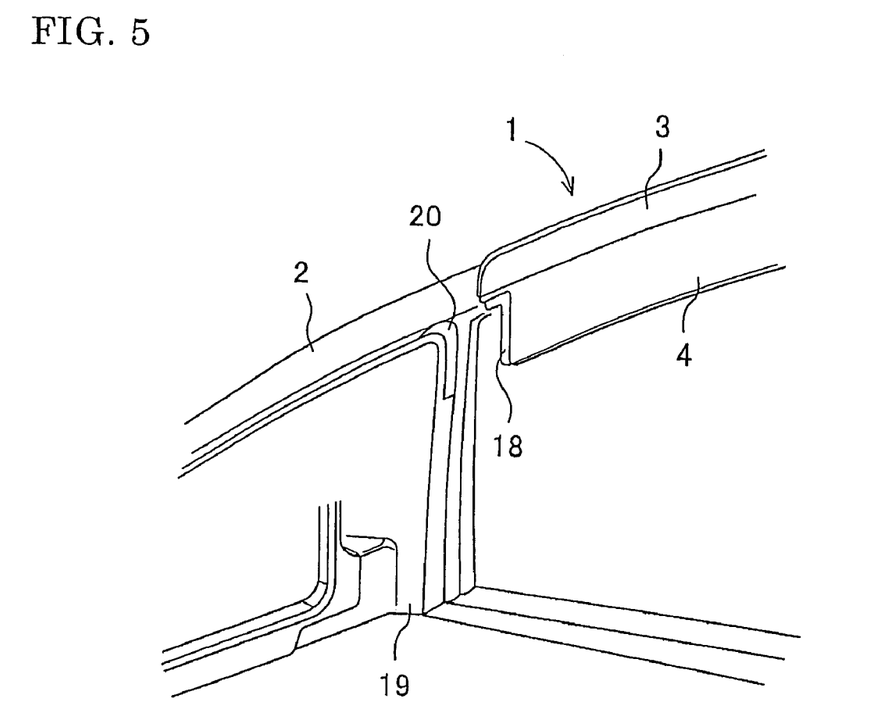
FIG. 5 is an illustrative drawing of a state where a latch strip at the tip of the side visor is inserted to a door-mirror base.

To mount the side visor 1 on the window frame 2 of the automobile V, the adhesive tape 9 is first adhered onto the inner surface of the covering portion 6 of the brim portion 3. Then, an engaging strip provided at the front end of the side visor 1 is engaged, as shown in FIG. 5, with the engaging concave portion 20 provided on the door mirror base 19. With the engaging convex portion 8 of the engaging portion 7 being engaged with the window frame 2, the brim portion 3 is fixed to the window frame 2 by the adhesive tape 9. In this manner, the side visor 1 is mounted on the window frame 2 of the automobile V through engagement of the engaging convex portion 8 and bonding by the adhesive tape 9. Here, the thickness of the adhesive tape 9 is adjusted so that a sum of that thickness and the thickness of the covering portion 6 of the brim portion 3 is approximately 1.6 mm. Moreover, a space between the engaging concave portion 20 of the door mirror base 19 and the engaging strip 18 of the side visor 1 is filled by inserting sealing material separately formed.

Here, in the automobile V, the width of the vehicle moulding of the window frame 2 in a vertical direction is varied within a range from approximately 10.0 mm to 14.0 mm (the width on a rear side is wider than the width on a front side). In the side visor 1, correspondingly to the variations in width of the vehicle moulding, the width of the covering portion 6 is varied within a range from approximately 12.0 mm to 16.0 mm (the width on a rear side is wider than the width on a front side).

Figure 6:
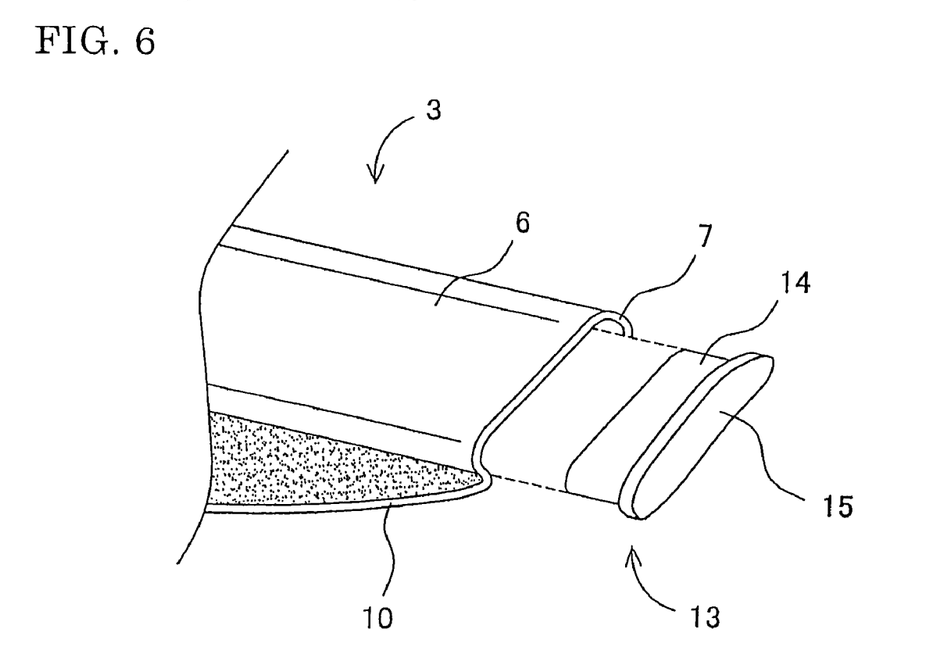
FIG. 6 is an illustrative drawing of a side end and an end cap of the side visor.

On the other hand, as shown in FIG. 6, the brim portion 3 has ends on both sides on each of which an end cap 13 is mounted. The end cap 13 is formed by integrally forming a base portion 14 insertable in a space formed inside of the covering portion 6 of the brim portion 3 and a lid portion 15 formed so as to be larger than the base portion 14. When the end cap 13 is inserted from a base portion 14 side, the lid portion 15 abuts on the end edge of the brim portion 3.

Since the brim portion 3 is made of stainless steel, the above-structured side visor 1 can achieve a strong sense of unity with the window frame 2 from any angle when mounted on the automobile V without impairing the design of the automobile V. Moreover, the metal-made brim portion 3 does not peel off like a metal-plated portion or an ornamental sealing. Therefore, even when the side visor is mounted on the automobile V for a long time, the design is not impaired.

Furthermore, the side visor 1 has a thickness of 1.6 mm at a portion to be mounted on the window frame 2 (the thickness of the covering portion 6 of the brim portion 3 and the thickness of the adhesive tape 9). Such a thickness is extremely thin compared with that of the conventional side visor 81 (approximately 8 mm). Thus, an extremely strong sense of unity with the window frame 2 can be achieved.

Moreover, since the width of the covering portion 6 of the brim portion 3 in the vertical direction is approximately equal to the width of the window frame 2 in the vertical direction, the design of the side visor and the design of the window frame 2 are merged, thereby eliminating a sense of discomfort (a sense of a foreign object). Furthermore, since the width of the covering portion 6 of the brim portion 3 in the vertical direction is approximately equal to the width of the window frame 2 in the vertical direction, only the visor portion 4 made of synthetic resin is positioned above the window pane 20. Therefore, a feeling that the side visor 1 is separately mounted can be eliminated, and there is no large influence on the design of the automobile V.

In addition, each end of the brim portion 3 has the end cap 13 inserted therein. Therefore, the danger of injuries due to a contact with the side end of the brim portion 3 after the visor for an automobile is mounted on the automobile V can be prevented, for example. Furthermore, since the brim portion 3 and the visor portion 4 are separately molded, it is possible to replace the visor portion 4 alone, for example.

Still further, since the side visor 1 is integrally provided with the connecting portion 10 along the lower end of the covering portion 6 of the brim portion 3, the connecting portion 10 is positioned above a glass run 16 when mounted on the automobile V. Therefore, an extremely strong sense of unity with the window frame 2 can be achieved.

Still further, the connecting portion 10 of the brim portion 3 is concave by a thickness approximately similar to the thickness of the adhesive tape 5 and the tip of the visor portion 4. Moreover, when the visor portion 4 is bonded to the brim portion 3, the covering portion 6 and the visor portion 4 are on the same plane. Therefore, the visor for an automobile not only has an excellent design when mounted on the automobile, but also can let droplets of water attached onto the covering portion 6 smoothly flow downward when it rains. Still further, since the connection between the brim portion 3 and the visor portion 4 is achieved through the adhesive tape 5 alone, the brim portion 3 and the visor portion 4 can be easily bonded together without using any tools at the time of manufacturing.

In addition, in the side visor 1, the engaging portion 7, which has the engaging convex portion 8, is provided at the upper end of the brim portion 3. Consequently, when the visor is mounted on the automobile V, the engaging portion 7 is engaged with the window frame 2, so that positioning the mounting location is easy and the visor is mounted very easily without a separate hardware. Still further, the mounting strength is high, and even if the automobile receives a strong impact while traveling, the visor for an automobile does not fall off. In addition, the brim portion 3 itself has a high strength so that it can resist damage.

Still further, the side visor 1 has a length extending from a front end to a rear end of the window frame 2 of the automobile V, and is provided with the engaging portion 7 over the entire upper edge of the brim portion 3. Therefore, when mounted on the automobile V, the side visor can achieve a strong sense of unity with the window frame 2 when viewed from any angle including front, side, and upper.

Still further, the side visor 1 has a convex portion connected to the connecting portion 10 of the visor portion 4. Therefore, positioning is easy when the brim portion 3 and the visor portion 4 are bonded together with the adhesive tape 5. Still further, the side visor 1 has the convex latch 11 oriented outwardly along the lower end of the connecting portion 10. Therefore, the brim portion 3 has a high bending strength, and resists damage even if receiving an impact. Still further, positioning is easy at the time of connection with the bonding portion 12 of the visor portion 4.

Still further, in the side visor 1, the outer surface of the visor portion 4 is flat at its rear edge. Therefore, even at a portion of connecting the front door and the rear door of the automobile V, a strong sense of unity with the window frame 2 can be achieved. Moreover, when a side visor having the same structure is also mounted on the window frame of the rear door, it is possible to give an impression as if two visors are in a series.

Here, the structure of the visor for an automobile according to the present invention is not restricted to the above embodiment, and can be modified as appropriate without departing from the gist of the present invention in, for example, the material, shape, and size of the brim portion and the visor portion and method of mounting on the window frame of the automobile.

Figure 7:
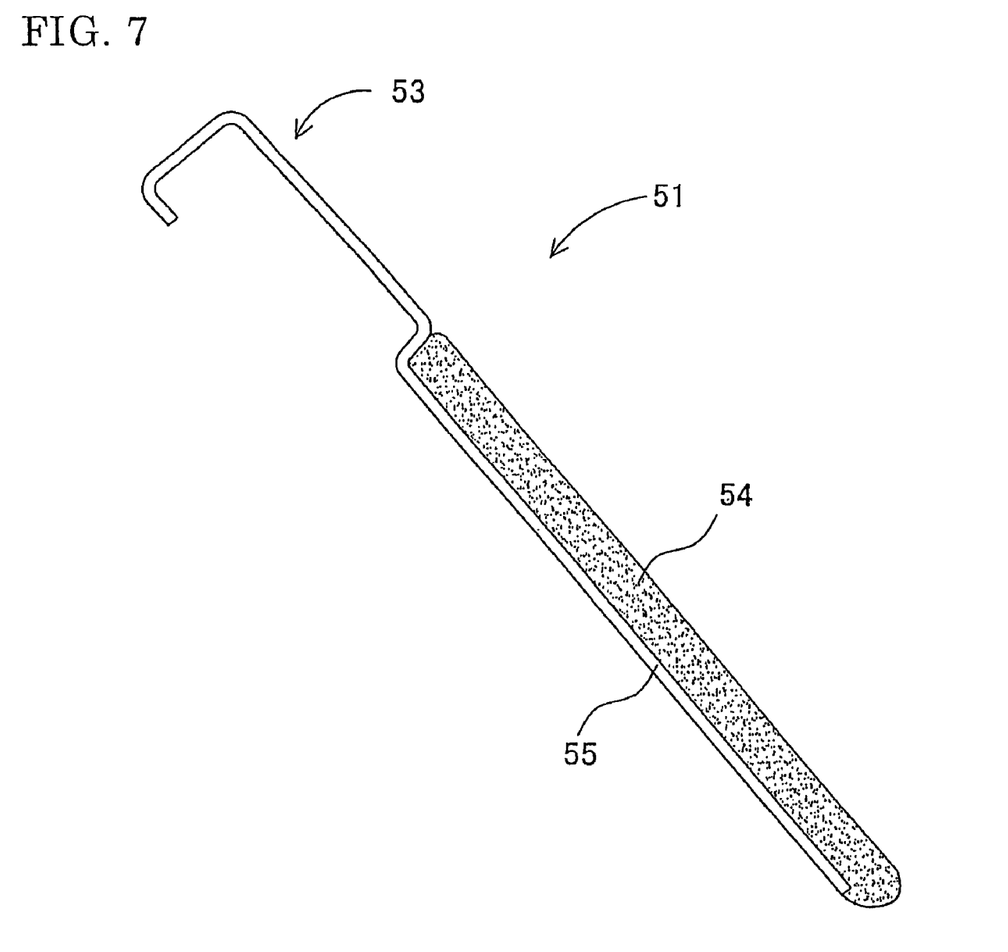
FIG. 7 is an illustrative drawing of a modification example of the visor for an automobile.
Figure 8:
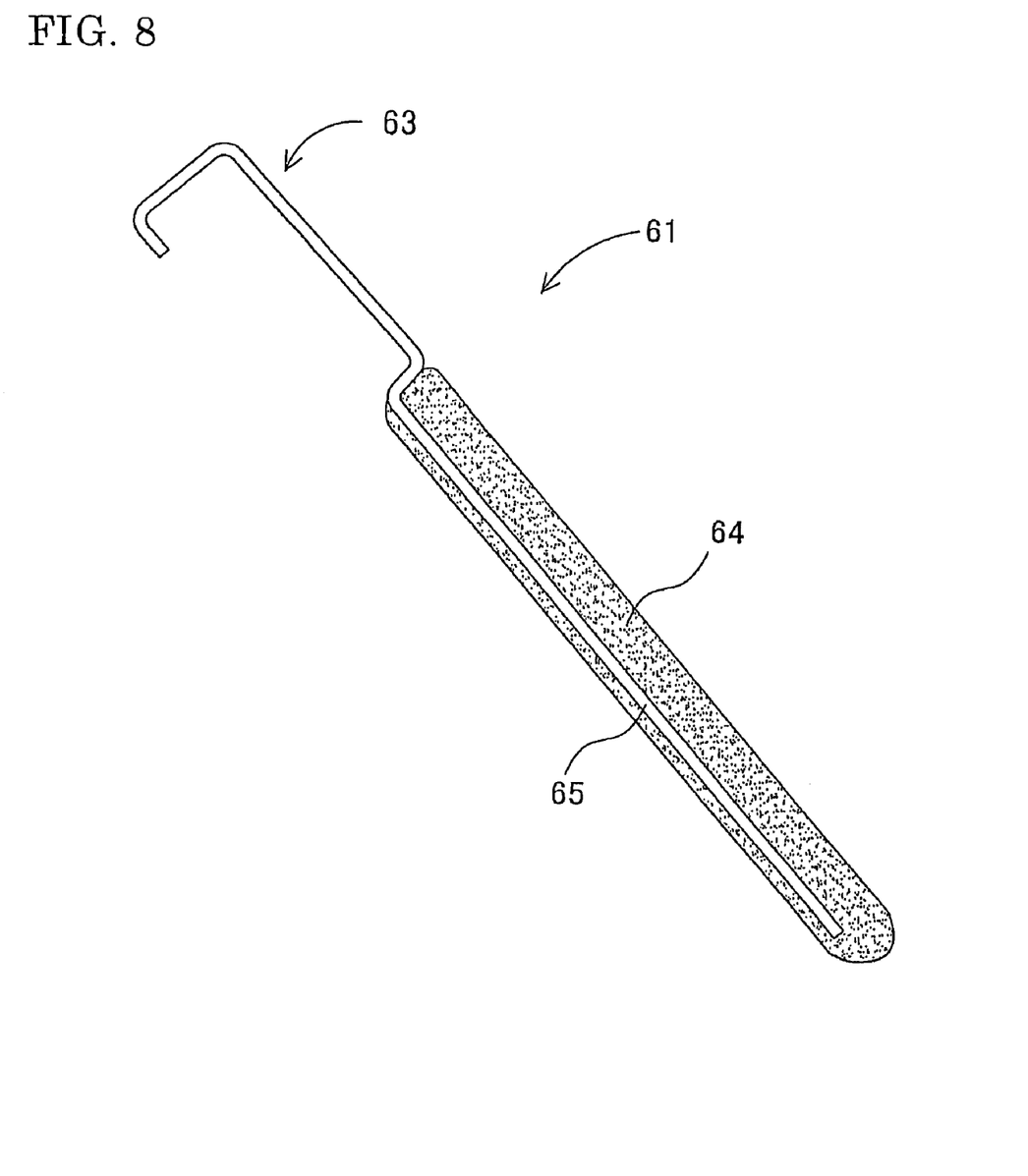
FIG. 8 is an illustrative drawing of another modification example of the visor for an automobile.
Figure 9:
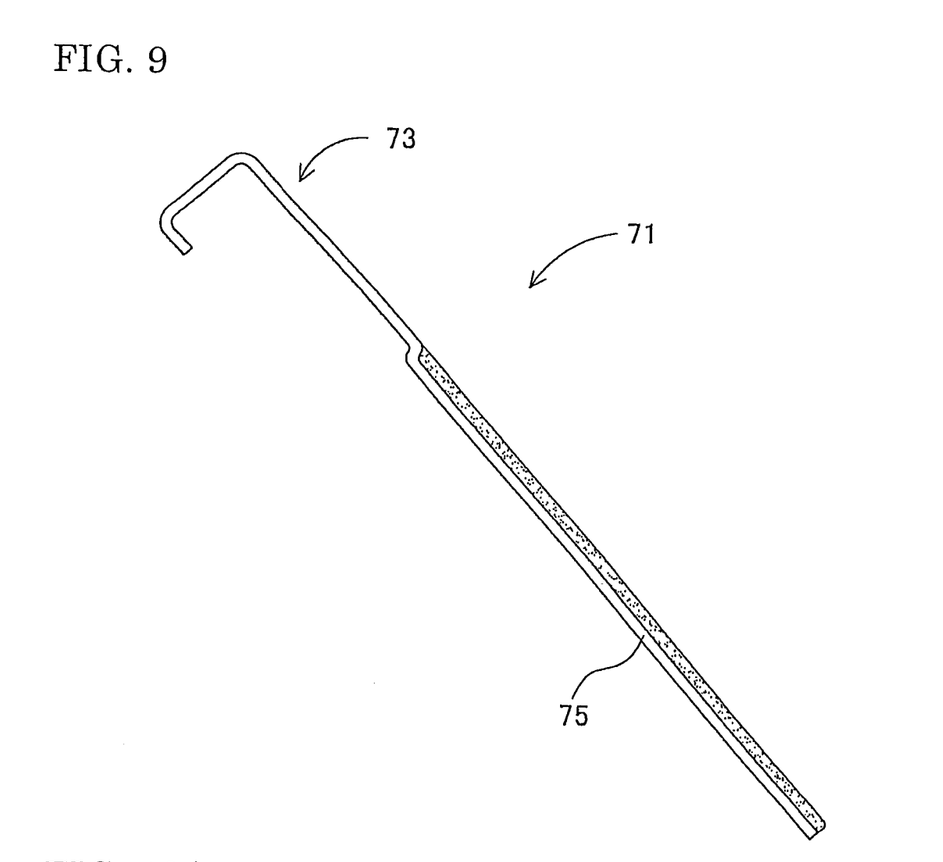
FIG. 9 is an illustrative drawing of still another modification example of the visor for an automobile.

FIGS. 7 to 9 are section view depicting modification examples of the visor for an automobile. In a visor for an automobile 51 shown in FIG. 7, an entire visor portion 54 is bonded onto the outer surface of a connecting portion 55 of a brim portion 53. When the visor for an automobile is formed in this manner, there are advantages that the visor portion 54 resists peeling-off from the brim portion 53 and also the strength of the visor portion 54 is increased.

Moreover, in a visor for an automobile 61 shown in FIG. 8, a connecting portion 65 of a brim portion 63 is embedded inside of a visor portion 64. When the visor for an automobile is formed in this manner, there are advantages that the visor portion 64 resists peeling-off from the brim portion 63 and also the strength of the visor portion 64 is increased. Here, when the connecting portion 65 is embedded inside of the visor portion 64, the connecting portion 65 is not necessarily embedded in the entire visor portion 64, and the connecting portion 65 can also be embedded in only a part of the visor portion 64.

On the other hand, in a visor for an automobile 71 shown in FIG. 9, the outer surface of a connecting portion 75 of a brim portion 73 is coated with synthetic resin. When the visor for an automobile is formed in this manner, there are advantages that the number of components can be reduced, thereby allowing the visor for an automobile to be produced at lower cost and also simplifying the work of the mounting operation. Here, instead of coating with synthetic resin, a resin sheet or the like can be affixed. Here, when resin is deposited onto the connecting portion of the brim portion as shown in FIGS. 7 and 8, an insert molding scheme can be used in which resin is poured into a mold in which a brim portion made of metal is set in advance. When such a structure is adopted, the brim portion and the visor portion can be connected together with an extremely high strength without using a two-sided tape. Furthermore, even when the visor portion is formed of transparent synthetic resin, only the inner surface of the connecting portion is seen through from the outside of the upper edge of the visor portion. Therefore, the appearance of the visor for an automobile is excellent.

Moreover, although the visor for an automobile in which the brim portion and the visor portion are bonded together by using an adhesive tape has been described in the present embodiment, adhesive resin can be used to bond the brim portion and the visor portion together, instead of an adhesive tape.

Furthermore, although the brim portion is made of stainless steel and the visor portion is made of acrylic resin in the present embodiment, this is not meant to be restrictive. There is no problem when the brim portion is made of another metal, such as aluminum, and the visor portion is made of another synthetic resin.

In addition, although the outer surface of the covering portion of the brim portion is not subjected to any process in the present embodiment, the outer surface can be arbitrarily colored in accordance with the color of the automobile on which the visor for an automobile is mounted, and also can be plated with metal, for example. Furthermore, although the covering portion has a thin plate shape herein, the covering portion can have a curved shape in accordance with the automobile. That is, the visor for an automobile according to the present invention can be modified as appropriate in the cover portion, the connecting portion, the size and shape of the visor portion, and others, in accordance with the design of the automobile on which the visor for an automobile is mounted. Therefore, the width of the covering portion in the vertical direction can be formed wider or the connecting portion can be formed in a groove shape with a narrow width.

Still further, the visor for an automobile is not restricted to the one as in the above embodiment in which the covering portion and the connecting portion of the brim portion are formed in an S shape in a cross section (that is, the covering portion extends outwardly and the connecting portion recesses outwardly), but can be modified to the one in which the covering portion and the connecting portion are positioned on the same plane. Here, when the covering portion and the connecting portion of the brim portion are formed by bending in an S shape in section as in the above embodiment, there is an advantage that the structural strength of the brim portion is extremely high.

Still further, in the visor for an automobile according to the present invention, the connecting portion and the upper edge of the visor portion can be engaged together with a rivet penetrating through both of the connecting portion and the upper edge. When such a structure is adopted, there are advantages that the connecting strength between the connecting portion of the brim portion and the visor portion is extremely high and, even if an automobile on which the visor for an automobile is mounted receives a strong impact while traveling, the brim portion and the visor portion would not be separated from each other. Here, in the case of such a structure, a hollow rivet, an extended rivet, or the like can be suitably used as a rivet.

Figure 10A:
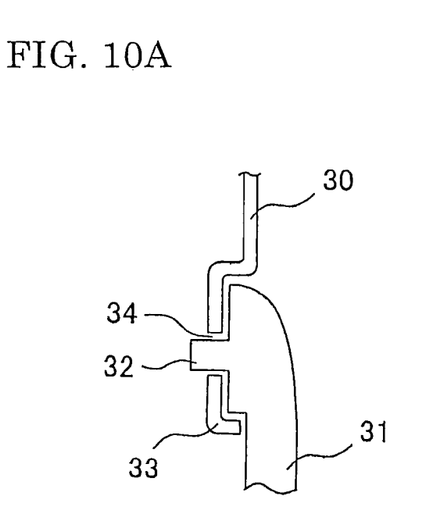
FIG. 10 is an illustrative drawing of a state of a connection state of a brim portion and a visor portion.

Still further, the visor for an automobile can be configured in a manner as shown in FIG. 10A such that a fitting protrusion 32 is provided on an upper edge of a visor portion 31, a fitting hole 34 is provided on a connecting portion 33 of a brim portion 30 and, with the fitting protrusion 32 fitting in the fitting hole, the connecting portion 33 and the upper edge of the visor portion 31 are welded together. When such a structure is adopted, in the visor for an automobile, the brim portion 30 and the visor portion 31 can be very easily assembled only by fitting the fitting protrusion 32 of the visor portion 31 in the fitting hole 34 of the connecting portion 33.

Figure 10B:
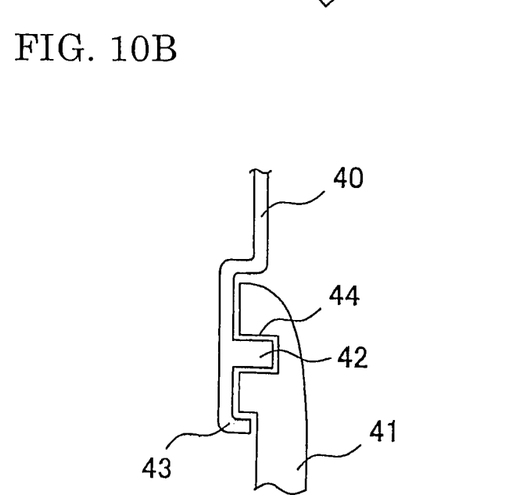

In addition, the visor for an automobile can be configured in a manner as shown in FIG. 10B such that a fitting concave portion 44 is provided on an upper edge of a visor portion 41, a fitting protrusion 42 is provided on a connecting portion 43 of a brim portion 40 and, with the fitting protrusion 42 fitting in the fitting concave portion 44, the connecting portion 43 and the upper edge of the visor portion 41 are bonded together. When such a structure is adopted, the brim portion 40 and the visor portion 41 in the visor for an automobile can be very easily assembled only by fitting the fitting protrusion 42 of the connecting portion 43 in the fitting concave portion 44 of the visor portion 41. Moreover, the brim portion 40 and the visor portion 41 can be easily separated from each other. Furthermore, when the brim portion 40 and the visor portion 41 are assembled, the fitting protrusion 42 is not exposed to the outside of the visor portion 41, and therefore the appearance is excellent. Here, as described above, when a fitting protrusion is provided to the connecting portion or the visor portion, the fitting protrusion is not restricted to have a column shape, but may have a cylindrical shape or a prism shape.

Figure 11:
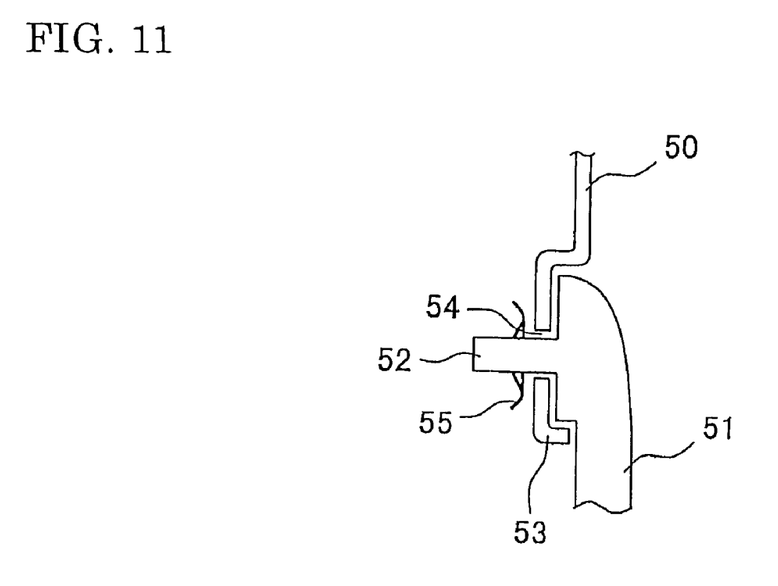
FIG. 11 is an illustrative drawing of a state of another connection state of the brim portion and the visor portion.

In addition, the visor for an automobile can be configured in a manner as shown in FIG. 11 such that a fitting protrusion 52 is provided to an upper edge of a visor portion 51, an insert hole 54 is provided on a connecting portion 53 of a brim portion 50 and, with the tip of the fitting protrusion 52 inserted in the insert hole 54 being engaged with an engaging plate 55, the connecting portion 53 and the upper edge of the visor portion 51 are bonded together. When such a structure is adopted, the brim portion and the visor portion in the visor for an automobile can be very easily assembled only by inserting the fitting protrusion of the visor portion in the insert hole of the connecting portion and engaging the tip of the fitting protrusion with the plate. Moreover, the brim portion 50 and the visor portion 51 can be easily separated from each other. Furthermore, even without using a two-sided tape or the like, an extremely high connection strength can be achieved.

Figure 12A:
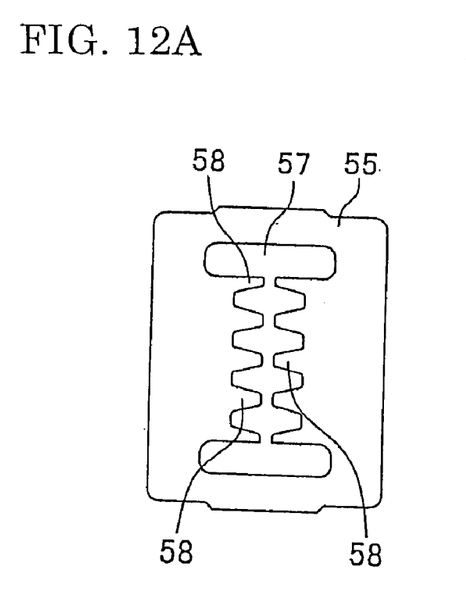
FIG. 12 is an illustrative drawing of an engaging plate.
Figure 12B:
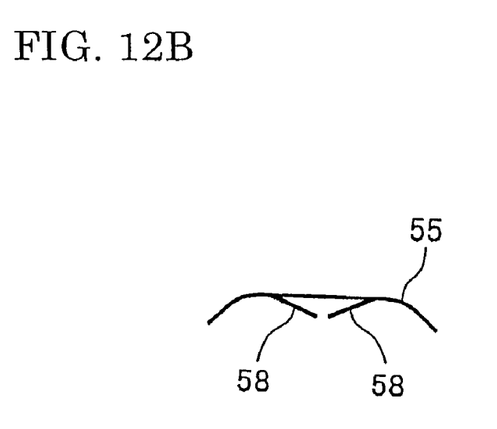

FIG. 12 depicts an example of the engaging plate 55 to be engaged with the tip of the fitting protrusion 52 inserted in the insert hole 54 of the connecting portion 53. This engaging plate 55 is formed in a rectangular shape, and is provided at its center an insert hole 57 formed by drilling. Also, the insert hole 57 is surrounded by a plurality of latch nails 58, 58, . . . which are provided in a vertically symmetrical manner and engaged with the fitting protrusion 52, with tips of these latch nails 58, 58, . . . protruding outwardly. When the engaging plate is structured in this manner, there are advantages that engagement with the tip of the fitting protrusion 52 is easier, and is hard to be unlocked. Another advantage is that, since the fitting protrusion 52 provided at the upper edge of the visor portion 51 can have a wide width, the bonding strength between the connecting portion and the upper edge of the visor portion can be further increased. Here, the engaging plate is not restricted to have a rectangular shape as described above, but can be modified to have a circular or oval shape, for example.

In addition, the structure for assembling the brim portion and the visor portion is not restricted to the structure in which the tip of the fitting protrusion inserted in the insert hole of the connecting portion is engaged with the engaging plate, but can be modified to be a structure in which the tip of the fitting protrusion inserted in the insert hole of the connecting portion is engaged with an engaging nail provided around the insert hole of the connecting portion.

In addition, although the visor for an automobile in which the bonding portion of the visor portion protrudes inwardly with respect to other portions has been described in the present embodiment, the visor for an automobile according to the present invention is not restricted to the one in which the bonding portion of the visor portion protrudes inwardly with respect to other portions, but can be the one in which the bonding portion has a concave shape, or the one in which the bonding portion of the visor portion and other portions are on the same plane.

Still further, the visor for an automobile according to the present invention is not restricted to the one as described in the present embodiment such that the convex latch at the lower end of the connecting portion of the brim portion is engaged with the lower end of the bonding portion of the visor portion protruding inwardly, but can be modified to be the one in which an engaging groove is formed on the inner surface of the visor portion and the convex latch at the lower end of the connecting portion is engaged with the engaging groove.

Still further, although the thickness of the metal forming the brim portion is 0.4 mm in the present embodiment, this is not meant to be restrictive. The thickness can be modified as appropriate within a range of 0.2 mm to 4 mm. Here, if the thickness of the metal forming the brim portion is 0.3 mm to 2 mm, the brim portion can be easily processed by bending, can have a sufficient strength, and can achieve a sense of unity with the window frame when mounted on the automobile. Thus, such a thickness is preferable and, more preferably, within a range of 0.3 to 2.0 mm.

In addition, the brim portion is not restricted to the one formed by bending, but can be formed in a manner such that an engaging portion, a covering portion, and a connecting portion are separately formed and then connected together.

On the other hand, although the structure has been described in the above embodiment in which the end cap is inserted in each of both ends of the brim portion, instead of the end cap, each of both ends can be coated with synthetic resin or the like, or each of both ends can be bent inwardly, thereby preventing the end edge of the brim portion from being exposed.

Still further, the visor for an automobile according to the present invention can be formed by inwardly bending the side end near the center side of the automobile. When such a structure is adopted, a strong sense of unity with the window frame can be achieved even at a portion of connecting the front door and the rear door of the automobile.

Still further, in the visor for an automobile according to the present invention, of the side ends of the brim portion, the one near the center side of the automobile when mounted on the automobile can be coated with synthetic resin. When such a structure is adopted, there is an advantage that there is no worry to damage the automobile at the time of mounting on and removal from the automobile.

Still further, the visor for an automobile is not restricted to the one as in the above embodiment in which the end edge outside of the engaging portion is provided with a clinch engageable with the window frame of the automobile, but can be modified to the one in which the end edge outside of the engaging portion is hemmed or coated with synthetic resin. When such a structure is adopted, there is an advantage that there is no concern to damage the automobile at the time of mounting the visor on and removing the same from the automobile.

In addition, in the above embodiment, the side visor is fixed to the window frame only by the adhesive tape. However, to mount the side visor, a latch member having a latch strip can be used in a supplemental manner. An example of such a mounting structure is, for example, such that, while a latch protrusion is provided to the inner surface of the brim portion, a latch hole is provided by drilling a latch member and, with the latch protrusion being inserted in the latch hole, the latch strip is latched with the window frame. The latch member for use in such a mounting structure may be made of metal or made of synthetic resin. Moreover, such supplemental latching by using the latch member can be performed at one point, or the latch member can be used at a plurality of points.

Still further, in the present embodiment, the connecting portion of the brim portion is in a strip shape along the covering portion. Alternatively, a plurality of connecting portions can be discontinuously provided along the covering portion. When such a structure is adopted, the bonding portion provided to the visor portion can be configured to protrude discontinuously corresponding to the connecting portion, or can be provided in a series along the upper end of the visor portion. In addition, the structure can be adopted in which no convex latch is provided on the connecting portion.

In addition, although the visor for an automobile in which the brim portion is formed by bending through press molding has been described in the above embodiment, the method of molding the brim portion by bending is not restricted to press molding, and methods such as roll forming and bender molding can be adopted.

Still further, although the side visor mounted on the window frame of the front door has been described in the above embodiment, the visor for an automobile according to the present invention can be modified to a visor for use at a window frame of a rear door or a visor for use at a skylight window.

What is claimed is:

1. A visor for an automobile comprising a brim portion mountable on a window frame of the automobile and a visor portion formed in a long strip shape along the brim portion, wherein the brim portion and the visor portion are formed individually, and the brim portion is made of metal.

2. The visor for an automobile according to claim 1, wherein
   the brim portion is provided with a covering portion to be fixed to the window frame of the automobile and a connecting portion to be connected to an upper edge of the visor portion, and the covering portion is formed so as to have a width in a vertical direction approximately equal to a width of the window frame or an ornamental moulding of the vehicle in a vertical direction.

3. The visor for an automobile according to claim 2, wherein
the connecting portion is provided to be formed so as to protrude downward from a lower end of the covering portion and to be concave with respect to an outer surface of the covering portion and, when the visor portion is connected to the connecting portion, an outer surface of the visor portion and the outer surface of the covering portion are approximately on a same plane.

4. The visor for an automobile according to claim 2, wherein
a section of the visor portion connected to the connecting portion is formed in a convex shape.

5. The visor for an automobile according to claim 2, wherein
the connecting portion is formed with a protrusion protruding outwardly along a lower end.

6. The visor for an automobile according to claim 2, wherein
the upper edge of the visor portion is provided with a fitting protrusion, and the connecting portion is provided with a fitting hole, and
the connecting portion and the upper edge of the visor portion are welded together in a state where the fitting protrusion fits in the fitting hole.

7. The visor for an automobile according to claim 2, wherein
the connecting portion is provided with a fitting protrusion and the upper edge of the visor portion is provided with a fitting concave portion, and
the connecting portion and the upper edge of the visor portion are bonded together in a state where the fitting protrusion fits in the fitting concave portion.

8. The visor for an automobile according to claim 2, wherein
the upper edge of the visor portion is provided with a fitting protrusion and the connecting portion is provided with an insert hole, and
the connecting portion and the upper edge of the visor portion are bonded together in a state where a tip of the fitting protrusion inserted in the insert hole is engaged with an engaging plate.

9. The visor for an automobile according to claim 2, wherein
the connecting portion and the upper edge of the visor portion are welded together by insert molding.

10. The visor for an automobile according to claim 1, wherein
the brim portion is formed of a metal thin plate not thinner than 0.2 mm and not thicker than 4.0 mm.

11. The visor for an automobile according to claim 1, wherein
the brim portion is provided at an upper end with an engaging portion engageable with the window frame of the automobile.

12. The visor for an automobile according to claim 11, wherein
the brim portion has a length extending from a front end to a rear end of the window frame of the automobile, and is provided with the engaging portion over an entire upper edge of the brim portion.

13. The visor for an automobile according to claim 11, wherein
the engaging portion is provided at an outer edge with a clinch engageable with the window frame of the automobile.

14. The visor for an automobile according to claim 1, wherein
the brim portion has a side end on which an end cap is mounted.

15. The visor for an automobile according to claim 1, wherein
the brim portion is formed by bending a side end near a center side of the automobile when mounted on the automobile.

16. The visor for an automobile according to claim 1, wherein
the brim portion is formed by coating, with synthetic resin, a side end near a center side of the automobile when mounted on the automobile.

17. The visor for an automobile according to claim 1, wherein
the visor portion has a flat outer surface on a side end near a center side of the automobile when mounted on the automobile.

* * * * *